(12) United States Patent
Meier et al.

(10) Patent No.: US 11,213,770 B2
(45) Date of Patent: Jan. 4, 2022

(54) FILTER ELEMENT FOR A MACHINE TOOL, MACHINE TOOL, USE, AND EXCHANGE METHOD

(71) Applicant: MANN+HUMMEL GmbH, Ludwigsburg (DE)

(72) Inventors: Alexander Meier, Speyer (DE); Norbert Maurer, Speyer (DE); Andreas Panni, Oestringen-Odenheim (DE); Dennis Stark, Mauer (DE); Michael Schulze, Speyer (DE)

(73) Assignee: Mann+Hummel GmbH, Ludwigsburg (DE)

( * ) Notice: Subject to any disclaimer, the term of this patent is extended or adjusted under 35 U.S.C. 154(b) by 80 days.

(21) Appl. No.: 16/566,089

(22) Filed: Sep. 10, 2019

(65) Prior Publication Data

US 2020/0001210 A1 Jan. 2, 2020

Related U.S. Application Data

(63) Continuation of application No. PCT/EP2018/054935, filed on Feb. 28, 2018.

(30) Foreign Application Priority Data

Mar. 10, 2017 (DE) .......................... 102017002283.6

(51) Int. Cl.
*B01D 29/23* (2006.01)
*B01D 35/16* (2006.01)

(52) U.S. Cl.
CPC ............. *B01D 29/23* (2013.01); *B01D 35/16* (2013.01); *B01D 2201/291* (2013.01);
(Continued)

(58) Field of Classification Search
CPC .. B01D 29/23; B01D 35/16; B01D 2201/291; B01D 2201/302; B01D 2221/14;
(Continued)

(56) References Cited

U.S. PATENT DOCUMENTS

2004/0144734 A1 7/2004 Suzumori et al.
2005/0072719 A1 4/2005 Sakata et al.
(Continued)

FOREIGN PATENT DOCUMENTS

CN 202061440 U1 12/2011
CN 104421077 A 3/2015
(Continued)

*Primary Examiner* — Madeline Gonzalez
(74) *Attorney, Agent, or Firm* — James Hasselbeck

(57) ABSTRACT

A filter element for cleaning an operating liquid of a machine tool is provided with a pressure-stable jacket permitting flow therethrough. A filter medium is arranged in the pressure-stable jacket. A first end disc and a second end disc are seal-tightly connected to opposite ends of the filter medium. The filter medium surrounds an inner raw-side cavity. The pressure-stable jacket surrounds the filter medium and is connected fixedly to the first and second end discs. The first end disc has an inlet opening for the operating liquid. The second end disc has a drainage opening provided with a releasable closure element that closes the drainage opening.

12 Claims, 5 Drawing Sheets

(52) U.S. Cl.
CPC .... *B01D 2201/302* (2013.01); *B01D 2221/14* (2013.01); *B01D 2239/1233* (2013.01)

(58) Field of Classification Search
CPC ............ B01D 2239/1233; B01D 27/08; B01D 35/30; B01D 2201/29; B01D 2201/30; B01D 2201/40; B01D 2201/24; B01D 35/00; B01D 2201/307; B01D 2201/31
USPC ....... 210/235, 232, 234, 248, 442, 441, 447, 210/455, 457, 485, 493.2, 282
See application file for complete search history.

(56) References Cited

U.S. PATENT DOCUMENTS

| | | |
|---|---|---|
| 2005/0077253 A1 | 4/2005 | Sugiura et al. |
| 2007/0034580 A1 | 2/2007 | Stein et al. |
| 2017/0080365 A1* | 3/2017 | Morris ................ F02M 37/42 |

FOREIGN PATENT DOCUMENTS

| | | |
|---|---|---|
| DE | 102008003740 A1 | 7/2008 |
| DE | 102009057438 B3 | 5/2011 |
| DE | 102011010687 A1 | 8/2012 |
| EP | 0553919 B1 | 8/1993 |
| EP | 1286739 A2 | 12/2001 |
| EP | 1522338 B1 | 4/2005 |
| EP | 1775005 A1 | 4/2007 |
| EP | 1938881 A1 | 7/2008 |
| EP | 2331228 B1 | 6/2011 |
| FR | 2948293 A1 | 1/2011 |
| KR | 100850196 B1 | 8/2008 |
| KR | 200456242 Y1 | 10/2011 |
| WO | 0158566 A1 | 8/2001 |
| WO | 2014082762 A1 | 6/2014 |
| WO | 2016087011 A1 | 6/2016 |

* cited by examiner

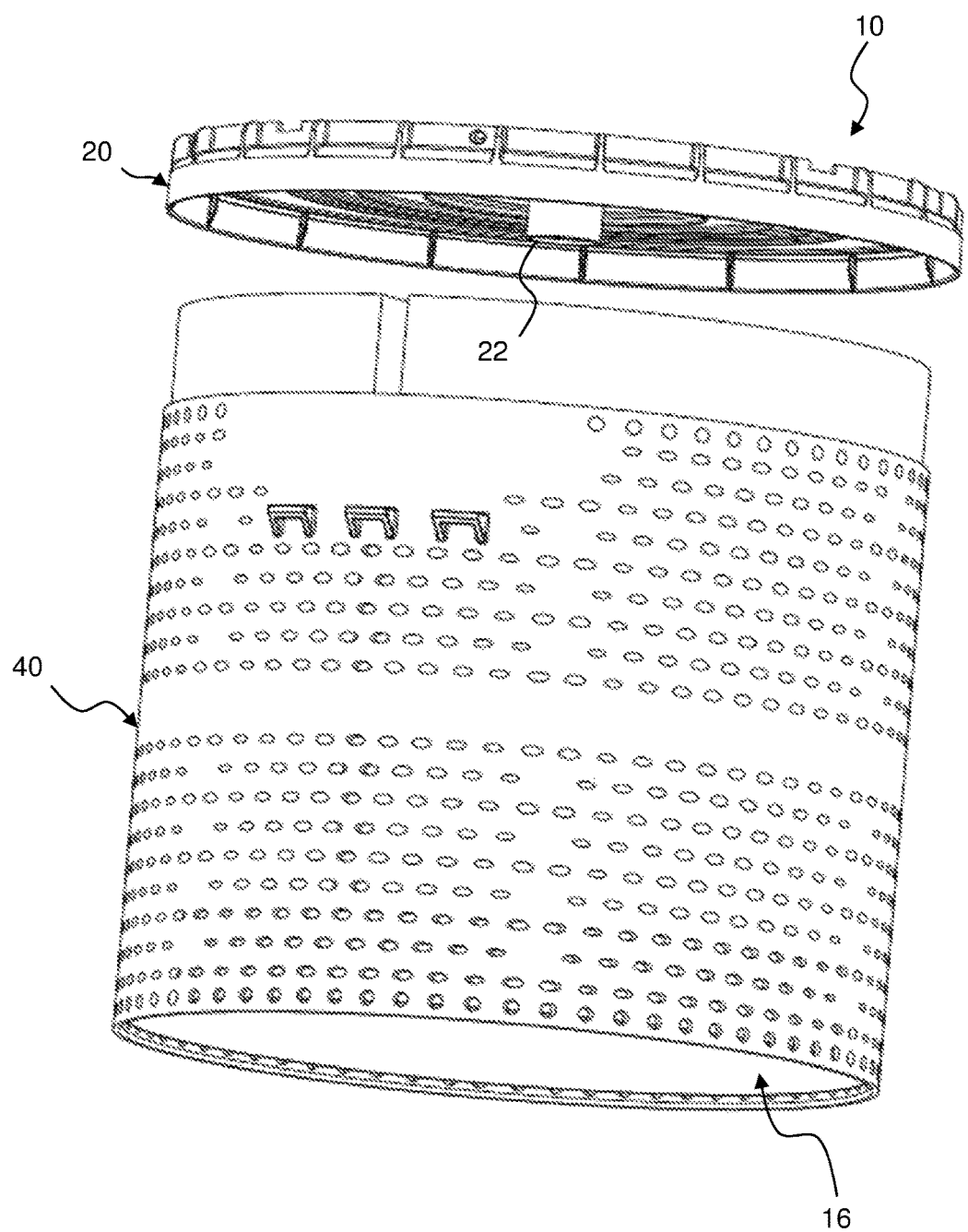
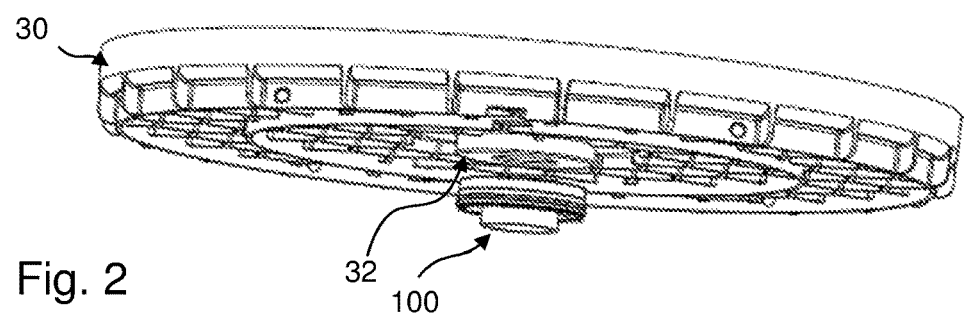
Fig. 2

FILTER ELEMENT FOR A MACHINE TOOL, MACHINE TOOL, USE, AND EXCHANGE METHOD

CROSS-REFERENCE TO RELATED APPLICATIONS

This application is a continuation application of international application No. PCT/EP2018/054935 having an international filing date of 28 Feb. 2018 and designating the United States, the international application claiming a priority date of 10 Mar. 2017 based on prior filed German patent application No. 10 2017 002 283.6, the entire contents of the aforesaid international application and the aforesaid German patent application being incorporated herein by reference to the fullest extent permitted by the law.

TECHNICAL FIELD

The invention concerns a filter element for operating liquids of a machine tool, in particular for a spark eroding machine. The invention concerns moreover a machine tool comprising such a filter element, the use of such a filter element in a machine tool, and an exchange method.

BACKGROUND

Known to a person of skill in the art for a long time, exchangeable wear parts are referred to as filter elements which generally comprise a porous filter medium body and sealing and/or stabilization means, such as end discs, seals etc., connected thereto. Filter elements, due to their exchangeability within housings, are also often referred to as filter inserts.

Filter elements for cleaning operating liquids of machine tools such as eroding machines are usually voluminous and exhibit a high weight in the loaded state. In the loaded state, they are removed from the machine tool and disposed of. A filter element for spark eroding machines is, for example, disclosed in DE 10 2009 057 438 B3.

Spark eroding machines serve for machining metallic materials. In this context, the eroded particles are rinsed off with a liquid dielectric fluid such as eroding oil and caught in the filter element. In the loaded state, the latter are heavy and difficult to handle due to their inevitably high weight. Often, the operating medium is blown out from the spent filter element with compressed air which, however, may lead to the filter medium becoming damaged and to the introduction of contaminated operating medium to the clean side of the filter element. In the machine, the filter elements are generally operated free-standing due to their size of approximately 30 cm to 80 cm in diameter. In this context, they are usually flowed through, as in the present invention, from the interior to the exterior; the liquid to be filtered is usually supplied, as in the present invention, through a hose connector to the interior. When the filter element is fully loaded with separated material, it often takes a comparatively long time in the pressureless state until the liquid still retained in the filter element has drained so that the filter element for a long time is too heavy for an exchange without lifting means.

SUMMARY OF THE INVENTION

It is an object of the invention to provide a filter element that enables a simpler handling, in particular a faster exchange.

The aforementioned object is solved by a filter element with two end discs, wherein in one of the end discs an inlet opening for the operating liquid into an inner cavity is arranged and at the oppositely positioned end disc a drainage opening is provided which corresponds with the cavity and is closeable by a closure element. The object is furthermore solved by the use of such a filter element in a spark eroding machine, with a spark eroding machine comprising such a filter element, as well as with an exchange method for such a filter element.

Beneficial embodiments and advantages of the invention result from the additional claims, the description, and the drawing.

Preferably, the filter element serves for cleaning an operating liquid of a machine tool, in particular of a spark eroding machine. It comprises, further preferred, a jacket which can be flowed through and is pressure-stable, which is made, for example, of plastic or metal and can be perforated like a grid or a perforated sheet; a filter medium arranged in this jacket, preferably folded in a zigzag shape and closed in a ring shape to a ring-shaped filter body with a clean side, preferably arranged at the exterior, and a raw side, preferably arranged at the interior, wherein the filter medium extends along a longitudinal axis between two end discs, sealingly connected to the filter medium, and surrounds an inner, preferably raw-side, cavity, wherein the jacket surrounds the filter medium and, further preferred, is connected fixedly to the end discs, wherein in one of the end discs an inlet opening for the operating liquid into the inner cavity is arranged, and wherein at the oppositely positioned end disc a drainage opening corresponding with the cavity is provided, wherein this oppositely positioned drainage-side end disc comprises a releasable closure element which closes the drainage opening for operating the filter element and preferably can be opened in preparation of the exchange of the filter element.

According to the invention, a filter element for cleaning an operating liquid of machine tools is thus proposed, comprising a filter medium arranged in a filter pot, which is in particular formed by the jacket and the end discs, between a clean side and a raw side, which is extending between two end discs and surrounds an inner cavity. In one of the end discs, an inlet opening for the operating liquid into the inner cavity is arranged. At the oppositely positioned end disc, a drainage opening is provided which corresponds with the cavity and is closable by a closure element.

Advantageously, the filter element, after reaching the maximum service life, can be disposed of more simply in that the operating liquid contained in the filter element can be drained. Usually, the final weight of such filter elements is significant due to their required size for cleaning an operating liquid and can be within the range of significantly more than 30 kg. Due to the possibility of draining at least a portion of the contents through the drainage opening, the weight is reduced and the operating personnel can more easily handle the filter element. Also, the operating liquid contained in the filter element can be collected and reused. For example, a dielectric fluid, for example, an eroding oil that is used in eroding machines, is expensive and can be recovered to a large extent in this way. The introduction of contaminants to the clean side of the filter element can be avoided. Also, due to the recovery of the eroding oil, an environmentally friendly disposal of the filter element is possible.

The end discs can be injection-molded or can be made of a potting compound, optionally with insertion parts of plastic or metal in the inlet opening and/or drainage opening. The end discs can also be embodied as formed sheet metal discs.

According to a beneficial embodiment, the inlet opening and the drainage opening can be positioned opposite each other along the longitudinal axis. Advantageously, inlet opening and drainage opening, when the drainage opening is open, can be in direct fluid communication. This enables a simple construction of the filter element. The operating liquid can simply drain from the raw-side cavity in the filter medium.

According to a beneficial embodiment, in the drainage opening a closure element can be arranged that projects axially inwardly into the filter pot. In particular, the closure element is immersed completely in the filter pot. In particular, the closure element can be arranged in an axially inwardly extending sealing socket which adjoins the drainage opening. Advantageously, in this context the sealing socket can comprise a thread so that the closure element can be screwed into the drainage opening. Since the closure element projects into the cavity in the filter pot, the bottom of the filter element can be designed to be planar so that the filter element can be placed without problems onto a surface. This facilitates handling and also mounting of the filter element because the closure element does not protrude and cannot be damaged or cannot cause damage. The sealing socket projecting into the filter pot enables a safe attachment of the closure element and a simple sealing action. The thread in the sealing socket enables a simple attachment and simple release of the closure element.

According to a beneficial embodiment, the closure element can be axially movable. In this way, the closure element can be moved with simple means between a sealing position and an open position.

Advantageously, a release tool for actuating the closure element and thus for emptying the filter element can be attached and removed again. The release tool can act directly or indirectly on the closure element. In this context, depending on the fastening type of the closure element in the sealing socket, it can be rotated and moved thereby axially inwardly into the filter pot or the closure element can be pushed into the interior. The release tool can have a contour with which it can engage a counter contour of the closure element in order to release it, for example, by a rotational movement. The release tool can comprise a thread in this context that can be screwed into a thread of the sealing socket. The release tool can moreover be provided with a seal which, when engaging the closure element with the release tool, ensures that the operating medium does not flow out of the filter element in an uncontrolled fashion upon opening of the drainage opening. The release tool can advantageously be embodied such that a drainage line can be connected. In this way, the operating medium can be safely collected and a contamination of the environment can be avoided.

Alternatively, a release tool can be provided with which the closure element is movable axially toward the drainage-side end disc. It is advantageous in any case when the closure element disappears completely in the filter pot in the closed and open state.

According to a beneficial configuration, the closure element can be arranged in an axially inwardly extending sealing socket at least in the closed state of the drainage-side end disc.

According to a beneficial embodiment, the sealing socket may comprise a thread by means of which the closure element can be moveable inwardly in axial direction for opening.

According to a beneficial embodiment, the thread can be provided commonly for the closure element and for a release tool. By rotating the release tool, the closure element can be moved into the housing pot and release the drainage opening in this way.

According to a beneficial embodiment, the closure element can comprise a sealing element at its exterior side. This enables a simple and reliable sealing action of the cavity when the sealing element is contacting an inner wall of a corresponding sealing socket.

According to a beneficial alternative embodiment, the closure element can be attachable by press fit in the sealing socket. Conceivable is alternatively also a bayonet connection of the closure element with the sealing socket. The type of attachment of the closure element which is suitable for the respective use of the filter element can be provided.

According to a beneficial alternative embodiment, the drainage opening can be closed or closeable by a filter element. In this way, the filter element can be arranged in the drainage opening. This is in particular beneficial when the closure element can be actuated from the inlet-side end disc. The operating liquid which is still located in the filter element can be discharged directly to the clean side of the filter element so that the filter element must be moved only once it is in the empty state. When the closure element is actuated from the drainage-side end disc, a filter element can also be provided in a drainage socket or drainage hose and supplied to the clean side in this way.

According to a beneficial embodiment, a jacket that can be flowed through and is pressure-stable can be provided which surrounds the filter medium. Preferably, the jacket is fixedly connected to the end discs. The pressure-stable jacket can support the filter medium. The jacket can be perforated in order to ensure flow therethrough. In this context, optionally a splash guard can be provided at or in the jacket so that cleaned operating liquid does not splash in an uncontrolled fashion out of the filter element.

According to a beneficial embodiment, the filter element can comprise a diameter between 300 mm and 350 mm, preferably between 310 mm and 340 mm. A drainage opening is particularly advantageous for these large dimensions. Such filter elements are used frequently in eroding machines.

According to a beneficial embodiment, the filter element can comprise an axial height between 250 mm and 500 mm, preferably between 300 mm and 450 mm. A drainage opening is particularly advantageous for these large dimensions. Such filter elements are used frequently in eroding machines.

The invention concerns moreover a machine tool, in particular a spark eroding machine, comprising a filter element as described above.

The invention concerns moreover the use of a filter element as described above in a machine tool, in particular in a spark eroding machine.

The invention concerns moreover a method for exchange of a filter element as described above, in particular in a machine tool, in particular a spark eroding machine, comprising the steps:

separating an inlet line from an inlet opening of the filter element, wherein the inlet line preferably is connected by means of a hand-operable quick coupling with the inlet opening;

prior to, after, or during the separation of the inlet opening, opening of the drainage opening by release or removal of the closure element, whereupon liquid retained in the filter element drains;

exchange of the filter element for a fresh filter element, preferably a filter element as described above with closed closure element;

reconnecting the inlet line to the inlet opening, preferably by means of the quick coupling.

Advantageously, when draining the liquid, it is guided or collected such that it does not reach the clean side, in particular the clean-side storage container.

BRIEF DESCRIPTION OF THE DRAWINGS

Further advantages result from the following drawing description. Embodiments of the invention are illustrated in the drawings. The drawings, the description, and the claims contain numerous features in combination. A person of skill in the art will consider the features expediently also individually and combine them to further expedient combinations.

It is shown in an exemplary fashion in:

FIG. 2 jacket and end discs of the filter element of FIG. 1 in exploded illustration;

EMBODIMENTS OF THE INVENTION

Figure 1:
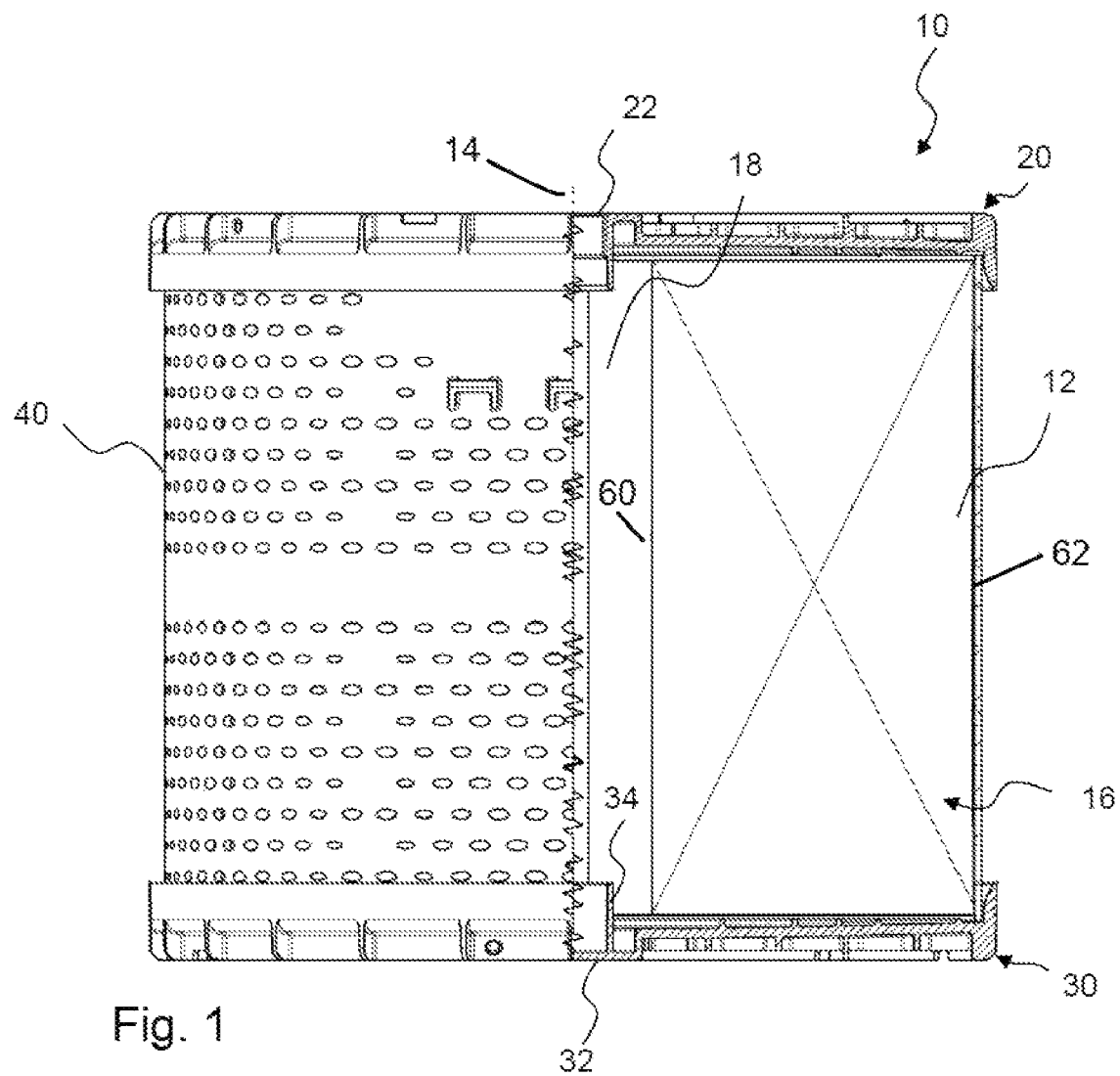
FIG. 1 a partially sectioned side view of a filter element according to a first embodiment of the invention.

In the Figures, same or same-type components are identified with same reference characters. The Figures show only examples and are not to be understood as limiting.

FIG. 1 shows in a partially sectioned side view a filter element 10 according to a first embodiment of the invention. FIG. 2 shows the jacket 40 and both end discs 20, 30 of the filter element 10 of FIG. 1 in exploded illustration. The filter element 10 will be explained in more detail in the following initially with reference to FIGS. 1 and 2.

The filter element 10 is embodied, for example, as a disposable filter, in particular as a disposable operating liquid filter of an eroding machine. This means that, when the filter capacity of the filter element 10 is exhausted, it is exchanged in its entirety and disposed of, wherein, prior thereto, operating liquid, for example, eroding oil, contained in the filter element 10 is however drained from the filter element 10. On the one hand, expensive operating medium is saved, on the other hand, handling of the filter element 10, which usually is still filled to a significant extent with operating agent and material grit, for example, metal chips, and therefore has a high weight, is facilitated.

A favorable filter element 10 for an eroding machine comprises advantageously diameters between 300 mm and 350 mm, preferably between 310 mm and 340 mm, as well as an axial height between 250 mm and 500 mm, preferably between 300 mm and 450 mm.

The filter element 10 can be basically embodied for filtering an arbitrary fluid, thus a liquid or a gas. Preferably, the filter element 10 according to the present embodiment is employed for filtering operating liquids of machine tools.

The filter element 10 comprises a filter medium 12 that extends along a longitudinal axis 14 between two end discs 20, 30 and surrounds an inner raw-side cavity 18 at the raw side 60 of the filter medium 12 into which the operating liquid to be cleaned flows. The filter medium 12 is surrounded and supported by a pressure-stable jacket 40. The interior between the jacket 40 and the two end discs 20, 30 forms the filter pot 16.

The inlet-side end disc 20, in the Figure at the top, comprises an inlet opening 22 for the operating liquid into the hollow cavity 18. The operating liquid flows radially in outward direction and exits the filter element 10 through the jacket 40, arranged at the clean side, to the clean side 62 of the filter element 10.

At the end disc 30 that is positioned opposite to the upper end disc 20, a closeable drainage opening 32 corresponding with the cavity 18 is provided. The inlet opening 22 and the drainage opening 32 are positioned directly opposite each other along the longitudinal axis 14 and are in direct fluid communication when the drainage opening 32 is open.

In FIG. 2, the filter element of FIG. 1 is illustrated in an exploded illustration with a release tool 100 with which the drainage opening 32 can be opened as needed.

Without engaged release tool 100, the lower drainage-side end disc 30 with the drainage opening 32 is embodied planar so that the filter element 10 can be placed without problems onto a flat ground.

As can be seen in the following FIGS. 3 to 5, the drainage opening 32 is closed by a closure element 50 that projects axially inwardly into the cavity 18.

Figure 3:
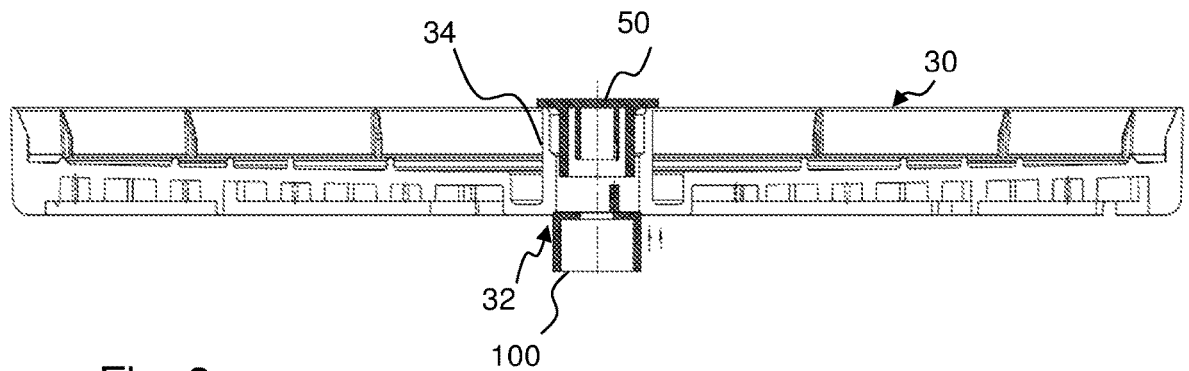
FIG. 3 an end disc of a filter element with drainage opening according to an embodiment of the invention.
Figure 4:
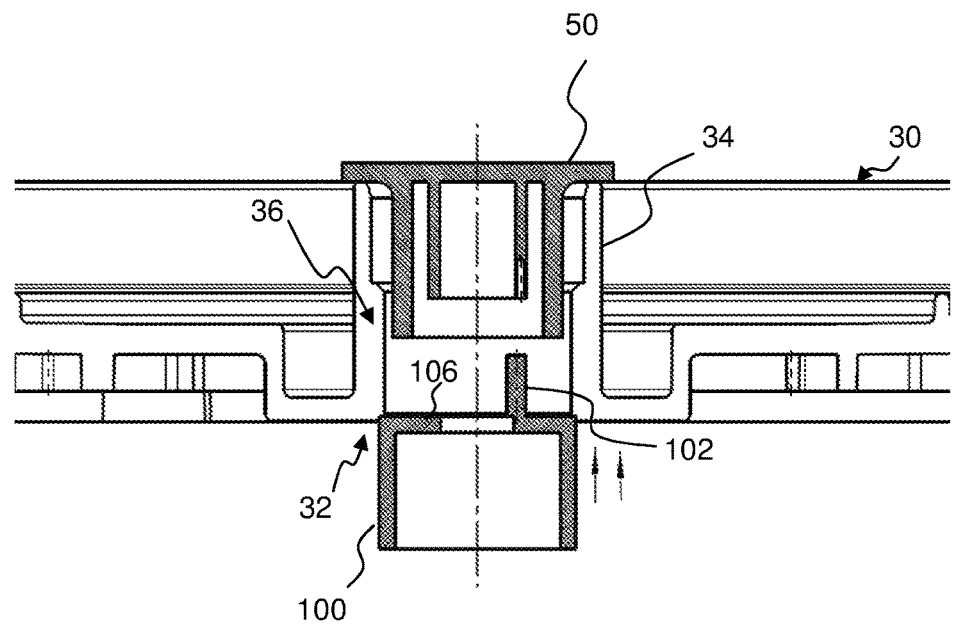
FIG. 4 a detail of the end disc of FIG. 3.

FIG. 3 shows a drainage-side end disc 30 of a filter element 10 with drainage opening 32 according to an embodiment of the invention with engaged release tool 100. FIG. 4 shows a detail of the end disc 50 of FIG. 3. The end disc 30 with drainage opening 32 and closure element 50 will be explained in more detail in the following initially with reference to the FIGS. 3 and 4.

The closure element 50 is arranged with press fit in a sealing socket 34, which is extending axially inwardly into the filter pot 16 and cavity 18 (FIGS. 1 and 2) and arranged about the drainage opening 32 in the end disc 30, and is immersed, viewed from the intended exterior side of the end disc 30, completely in the sealing socket 34. Prior to assembly of the filter element 10 (FIGS. 1 and 2), the closure element 50 can be inserted into the end disc 30 and, for example, pressed into the sealing socket 34.

At the exterior end of the sealing socket 34, a thread 36 is provided at its inner side into which the release tool 100 can be screwed in order to move the closure element 50 out of the press fit and thus open the drainage opening 32.

The release tool 100 is pot-shaped and comprises an axially projecting pin 102 which pushes the closure element 50 upwardly when the release tool 100 is screwed into the thread 36. The pot bottom 106 of the release tool 100 comprises an opening through which the operating liquid can drain. Optionally, a hose can be connected to the release tool 100 in order to discharge the draining operating liquid in a targeted fashion. Optionally, a filter medium can be provided at the release tool 100, or a filter medium can be inserted between release tool 100 and closure element. The operating medium which is draining when opening the closure element 50 can then be supplied to the clean side of the filter element 10 (FIGS. 1 and 2).

Figure 5:
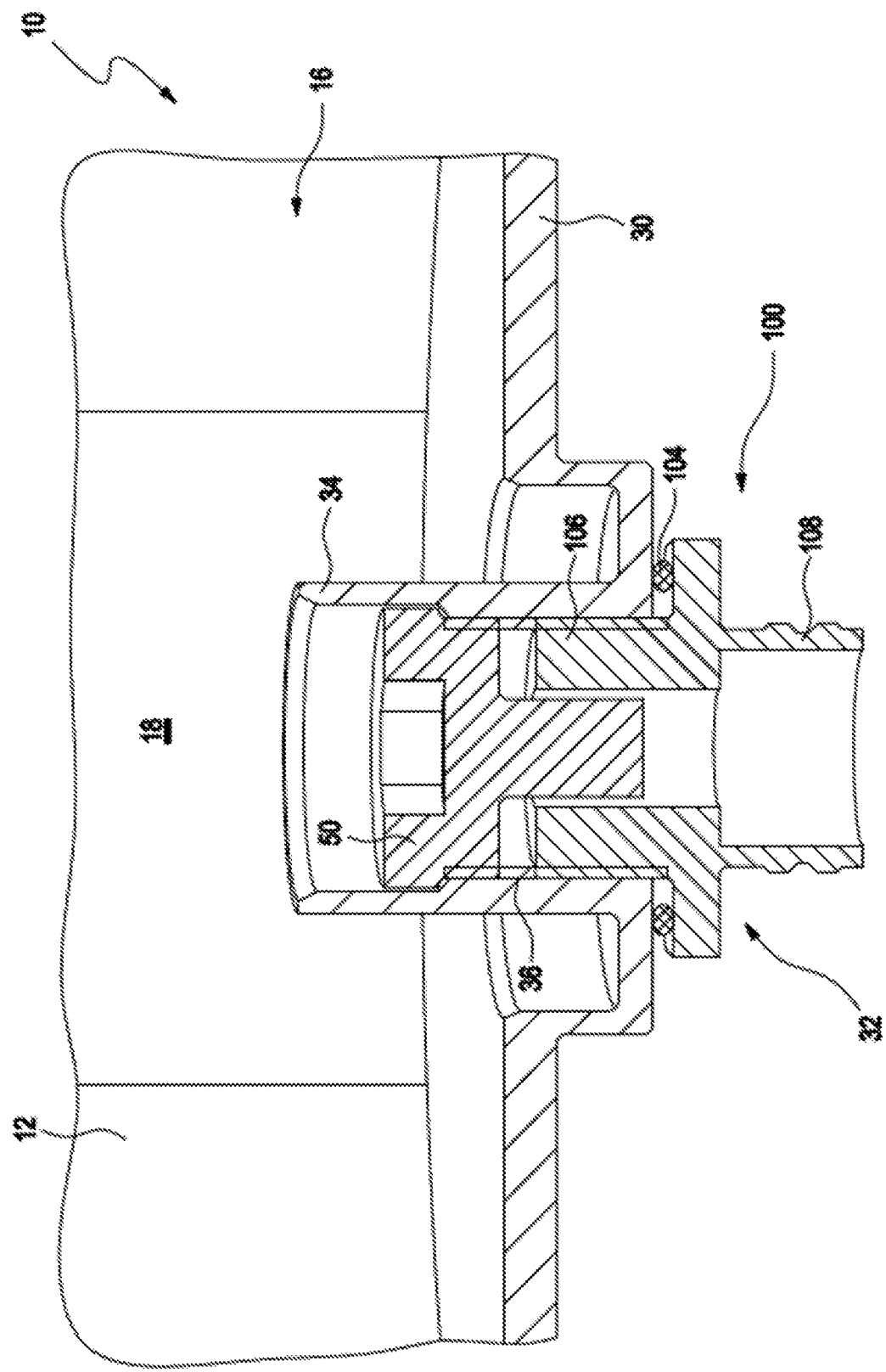
FIG. 5 a detail of an end disc of the filter element with drainage opening according to a further embodiment of the invention.

FIG. 5 shows a detail of a drainage-side end disc 30 of a filter element 10 with drainage opening 32 according to a further embodiment of the invention.

In contrast to the preceding embodiment, the closure element 50 is not arranged with press fit in the sealing socket 34 but is screwed into the thread 36 at the inner side of the sealing socket 34. The thread 36 is provided commonly for the closure element 50 and for the release tool 100. Optionally, two different threads for closure element 50 and release tool 100 can be provided also.

The release tool 100 is embodied as a hollow cylinder and comprises, approximately at the center, a collar which is expediently embodied as a polygon. The part 106 of the release tool 100 projecting into the sealing socket 34 comprises an outer thread. The hose socket 108 projecting past the end disc 30 serves as a hose nozzle for fastening a hose.

For opening the drainage opening 32, the release tool 100 is screwed into the sealing socket 34 and entrains by a key/lock contour the closure element 50 with the rotational movement. The closure element 50 is thus moved into the filter pot 16 and releases in this way the drainage opening 32. In the completely screwed-in state, the release tool 100 can be sealed relative to the end disc 30 by means of an annularly extending seal 104, for example, an O-ring seal, so that the operating medium can be drained fluid-tightly through the hose socket 108.

Optionally, here a filter medium can be provided also at the release tool 100, or it is possible to insert a filter medium between release tool 100 and closure element 50. The operating medium which is draining upon opening of the closure element 50 can then be supplied to the clean side of the filter element 10 (FIGS. 1 and 2).

Figure 6:
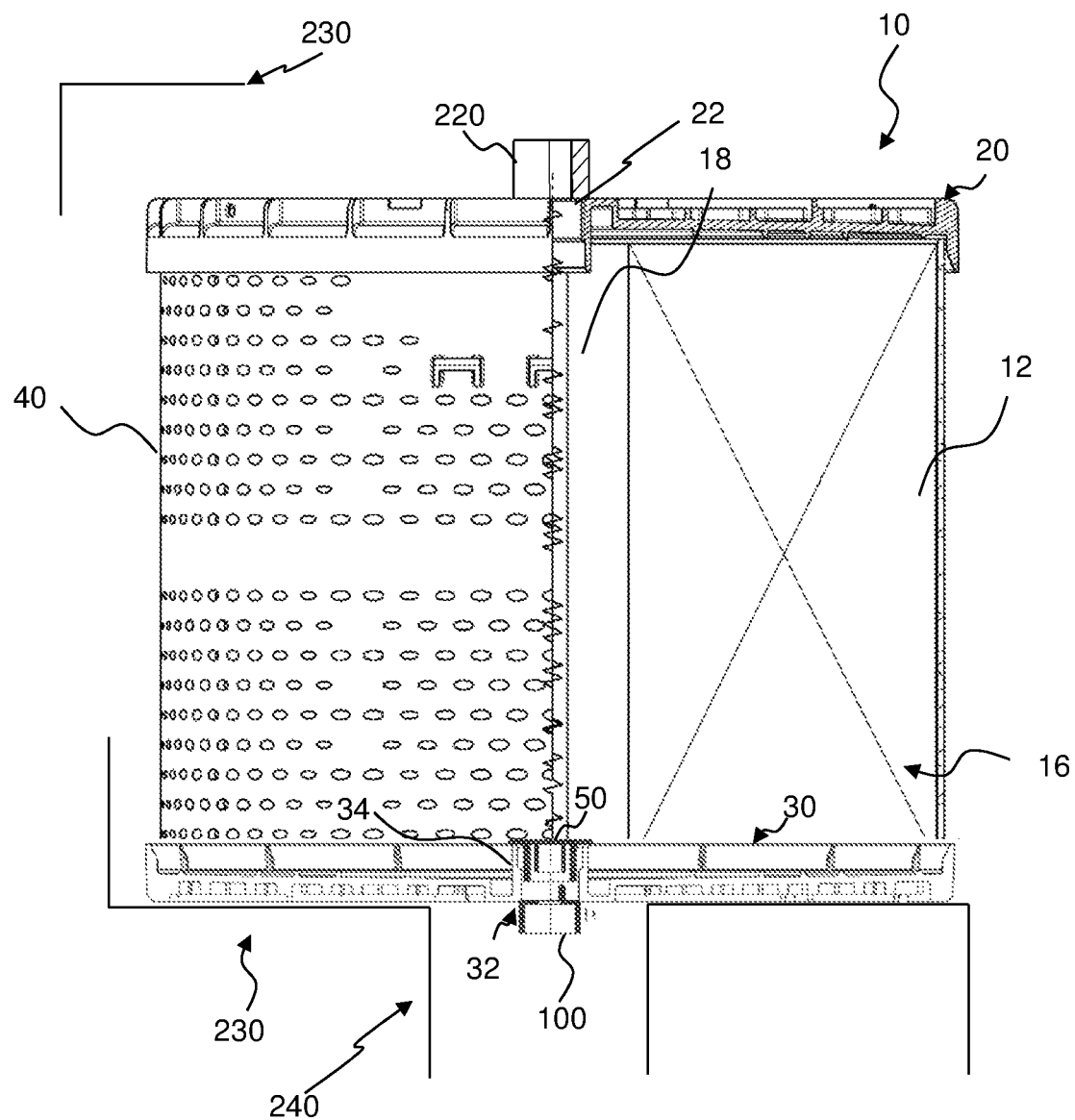
FIG. 6 a schematic illustration of a spark eroding machine having a filter element which shown in a partially sectioned side view.

FIG. 6 shows a spark eroding machine 230 comprising a filter element 10 as described above. An inlet line 220 is connected detachably with the inlet opening 22. Prior to, after, or during the separation of the inlet line 220, the closure element 50 is released, for example, by means of a release tool 100, so that the drainage opening 32 opens and liquid retained in the filter element can drain, for example, through the channel 240 in or at a filter base 230 in or at the spark eroding machine 230. The channel 240 can be opened, for example, for the purpose of servicing, or the filter element 10 can be moved, only for the purpose of servicing, above the channel 240 or at another location that enables access to the drainage opening 32 so that drainage is enabled.

What is claimed is:

1. A filter element (10) for cleaning an operating liquid of a machine tool, comprising:
   a jacket (40);
   a filter medium (12), arranged within the jacket (40) that can be flowed through and is pressure-stable, comprising:
       a clean side (62); and a raw side (60);
       two end discs,(20,30), seal-tightly and connected directly onto axially opposite ends of the filter medium (12);
       wherein the filter medium (12) extends along a longitudinal axis (14) from a first one of the two ends discs to a second one of the two end discs, and surrounds an inner raw-side cavity (18) of the filter medium;
   wherein the jacket (40) is arranged on a radially outer surface of the filter medium (12) and surrounds the filter medium (12) and is connected fixedly to the two end discs (20, 30), the jacket (40) having a plurality of through holes extending radially through the jacket (40) through with the operating liquid flows radially outwardly;
   an inlet opening (22) formed in the first one of the two end discs (20) for the operating liquid into the inner raw-side cavity (18);
   wherein the second one of the two end discs is a drainage-side end disc (30) having a drainage opening (32) which opens into the inner raw-side cavity (18);
   wherein the drainage-side end disc of the filter element forms a sealing socket (34) formed as a tubular projection projecting axially inwardly to the inner raw-side cavity, the drainage opening extending axially through an interior of the tubular projection and opening into the inner raw-side cavity (18) of the filter medium (12);
   a releasable closure element arranged in and axially moving in the interior of the tubular projection of the drainage-side end disc (30) to open or close the drainage opening (32), the closure element axially inwardly movable in the tubular projection from a closed position to an open position for opening the drainage opening (32) of the drainage-side end disc (30) before replacing the filter element;
   a screw thread formed on the interior of the tubular projection of the drainage-side end disc into which a release tool screwable into the screw thread in the interior of the tubular projection to engage against the releasable closure element and axially move the releasable closure element from the closed position to the open position.

2. The filter element according to claim 1, wherein the inlet opening (22) and the drainage opening (32) are positioned directly opposite each other along the longitudinal axis (14) and are in direct fluid communication when the drainage opening (32) is open.

3. The filter element according to claim 1, wherein the closure element (50) is axially movable for opening the drainage opening (32) prior to exchange of the filter element.

4. The filter element according to claim 1, further comprising:
   a filter pot (16) arranged between the two end discs;
   wherein the closure element (50), at least in the closed state, projects from the drainage-side end disc (30) axially inwardly into the filter pot (16).

5. The filter element according to claim 1, wherein the closure element (50), at least in the closed state, is completely countersunk in the drainage-side end disc (30).

6. The filter element according to claim 1, wherein the releasable closure element has a thread that engages with the screw thread of the tubular projection; wherein the release tool engages with the releasable closure element to rotate the releasable closure element to axially move the releasable closure element from the closed position to the open position.

7. The filter element according to claim 1, wherein the closure element (50) for closing the drainage opening (32) is press fit into the sealing socket (34) or at the sealing socket (34).

8. The filter element according to claim 1, wherein the drainage opening (32) is closed or can be closed by a drainage filter element (70).

9. The filter element according to claim 1, wherein the filter element has an outer diameter of between 300 mm and 350 mm.

10. The filter element according to claim 1, wherein the filter element (10) has an axial height between 250 mm and 500 mm.

11. A machine tool or a spark eroding machine, comprising
a filter element (10) according to claim 1.

12. A method for exchange of a filter element according to claim 1 when installed in a spark eroding machine, comprising the steps:
 separating an inlet line from the inlet opening (22);
 releasing or removing the closure element (50), opening the drainage opening (32);
 draining liquid retained in the filter element through the drainage opening (32);
 subsequently removing the filter element (10) from the spark eroding machine;
 installing a fresh filter element (10) in the spark eroding machine;
 connecting the inlet line to the inlet opening (22) of the fresh filter element (10).

\* \* \* \* \*